Patented Feb. 17, 1948

2,436,270

UNITED STATES PATENT OFFICE 2,436,270

POLYIODO DIARYL ALIPHATIC ACIDS AND PROCESS FOR THEIR MANUFACTURE

Erwin Schwenk, Montclair, N. J., and Domenick Papa, Brooklyn, N. Y., assignors to Schering Corporation, Bloomfield, N. J., a corporation of New Jersey No Drawing. Application May 22, 1944, Serial No. 536,834

4 Claims. (Cl. 260—515)

The present invention relates to the manufacture of polyiodo diaryl alkene carboxylic acids and their salts.

It is the general object of the invention to produce polyiodo diaryl alkene carboxylic acids and their metal and amine salts having at least two iodine atoms, the iodine being either positioned on one aryl group alone, or distributed between both aryl groups, the phenyl groups being, however, free from hydroxy groups or their functional derivatives.

It is also an object of the invention to provide compounds which are non-toxic and are capable of being administered perorally and by the aid of which X-ray pictures of satisfactory contrast can be obtained.

A further object of the invention is to provide contrast agents in which the iodine is firmly bound to the aryl nucleus or nuclei and which are ultimately eliminated from the body without kidney damage, in substantially unchanged condition, whether administered by mouth or by injection.

A still further object of the invention is to provide chemo-therapeutic substances having a marked bactericidal action without at the same time causing injury to the tissues.

We have found that polyiodo compounds of the class described can be prepared by condensing an aromatic aldehyde in which the double bond of the aldehyde group forms part of a conjugated system, the second double bond being either of aliphatic nature or forming one of the double bonds of the aryl radical, with a salt of an aryl aliphatic carboxylic acid having a reactive methylene group contiguous to the carboxyl group, the aliphatic chain being either saturated or unsaturated, there being at least two iodine atoms substituted in the nucleus of one of the starting compounds or of both considered together. The condensation can be conveniently effected in the presence of a dehydrating agent like acetic anhydride or other fatty acid anhydride and with the aid of heat, the acid being preferably employed in the form of the potassium or sodium salt. This type of reaction is generally known as a Perkin reaction, but other modifications thereof may also be employed, for example, the Claisen reaction, wherein the methyl, ethyl or other ester of the acid is employed, yielding the corresponding ester of the diaryl alkene carboxylic acid, which can be hydrolyzed in known manner to produce the free acid.

Among the aromatic aldehydes that may be employed in the present invention are benzaldehyde and cinnamaldehyde, and their iodinated derivatives; while among the aryl aliphatic acids that can be used may be mentioned phenyl acetic acid, phenyl propionic acid, phenyl butyric acid and phenyl iso-crotonic acid, and the corresponding naphthyl acids, for example, naphthyl acetic and propionic acids, and their nuclearly-substituted iodinated derivatives, the alkali metal salts of these acids being usually employed in the reaction. By such a synthesis polyiodinated diaryl alkene carboxylic acids are obtained which could not be produced, at least not readily, by iodination of the corresponding unsubstituted diaryl alkene carboxylic acids. The unsaturated aliphatic bridge of the products obtained by the condensation can, if desired, be saturated by cautious catalytic reduction.

Our new compounds are suitable for use not only as contrast agents for roentgenographic diagnosis and as chemo-therapeutic or germicidal agents, but also as intermediates for the manufacture of other compounds of these and other types.

The compounds of the invention fall within the following general formula

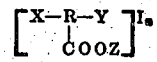

wherein X and Y are the same or different aromatic radicals, and R is a trivalent straight or branched aliphatic chain, preferably unsaturated and preferably having from 2 to 6 carbon atoms, while $n$ is an integer having a value of at least 2 and preferably no more than 5, the iodine being attached directly to nuclear carbons (of one or both nuclei), and Z being hydrogen, a metal, or an amine, for example, an alkylolamine, radical.

The reaction may be illustrated by the following equations:

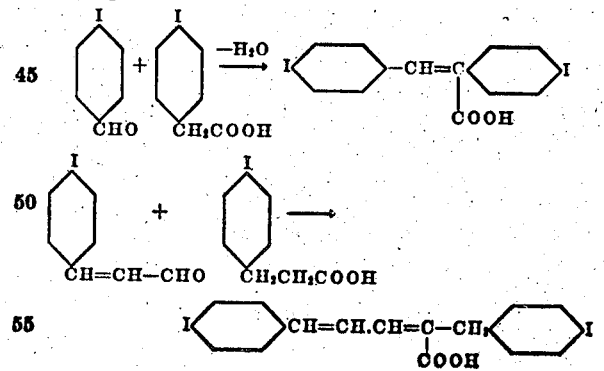

The invention is further illustrated by the following examples:

EXAMPLE I

*Production of α-(p-iodophenyl)-meta-iodo cinnamic acid*

19.5 g. of m-iodo benzaldehyde and 25.4 g. of anhydrous potassium p-iodophenyl acetate were condensed in about 100 cc. of acetic anhydride, the mixture being heated for approximately six to eight hours at 100–110° C. The reaction product was then cooled to about 70° C. and the excess acetic anhydride was decomposed by the cautious addition of water. The crystalline residue was dissolved in a large volume of ether and washed free of acetic acid with water. The ether solution was then extracted with dilute sodium carbonate. After boiling out the ether, the carbonate solution was acidified with concentrated HCl. The diiodo acid was obtained in a yield of 28 g. and melted at 186–195° C. Recrystallization from a mixture of water and acetone gave a yield of 26 g. of a product melting at 193–195° C.

EXAMPLE II

*Production of α-(p-iodo phenyl)-p-iodo cinnamic acid*

This compound was prepared by condensing anhydrous potassium p-iodo phenyl acetate and p-iodo benzaldehyde as outlined in Example I. The diiodo acid is obtained as pale yellow needles from benzene-petroleum ether melting at 197–198° C.

EXAMPLE III

*α-(p-Iodo benzyl)-p-iodo cinnamic acid*

There were heated for 70–80 hours at 100° C., 11.6 g. p-iodo benzaldehyde, 16 g. of anhydrous potassium β-(p-iodo phenyl)-propionate, and 100 cc. of acetic anhydride. Excess acetic anhydride was decomposed with water and the reaction mixture then worked up using the ether-sodium carbonate method, as described in Example I. Purified by crystallization from benzene, the diiodo acid melted at 201–202° C.

EXAMPLE IV

*α-(p-Iodo-benzyl)-m-iodo cinnamic acid*

Proceeded as described for Example III using anhydrous potassium β-(p-iodo phenyl) propionate and m-iodo benzaldehyde. The diiodo acid was purified by crystallization from benzene and melted at 164–166° C.

By the use of the appropriate starting compounds other homologues and analogues of polyiodo aryl cinnamic acid may be prepared, and likewise other polyiodo diaryl aliphatic acids having a connecting chain of two or more carbon atoms. In general, compounds having an alkene or alkadiene chain, of two to six carbon atoms (including branched carbons but excluding the carboxyl group) are preferred. Thus the polyiodo diaryl compound having an intermediate chain of six carbon atoms, as just defined, may be obtained by condensing iodinated cinnamaldehyde with γ-(iodo-phenyl) butyric acid. The corresponding naphthalene derivatives can be obtained by the use of the corresponding iodo-naphthalene acetic acid and its homologues, and of iodo-naphthaldehyde. Thereby, for example, α-iodonaphthyl β-iodophenyl acrylic acid and α-iodophenyl-β-iodonaphthyl acrylic acid may readily be prepared. In general, all aryl and aralkyl aldehydes can be employed which take part in a Perkin type of reaction, that is, those wherein the double bond of the aldehyde group is in conjugated relation to another carbon-to-carbon double bond.

The polyiodo compounds of the present invention can, as already stated, be administered by mouth and may be marketed in the form of tablets in which the contrast agent is combined with a suitable binder like starch, sugar, etc., or injected in the form of their more or less soluble salts. These salts include the alkali metal salts, like sodium or potassium, and the amine salts, including the alkylolamine salts like diethylaminoethanol, monoethanolamine and triethanolamine compounds, which may be prepared from the free acids in the usual way.

We claim:
1. α-(p-Iodophenyl)-p-iodo cinnamic acid.
2. α-(p-Iodo-benzyl)-p-iodo cinnamic acid.
3. An α-phenyl cinnamic acid having an iodine atom on each of the phenyl groups in one of the meta and para positions.
4. Polyiodo diphenyl alkene carboxylic acids of the general formula

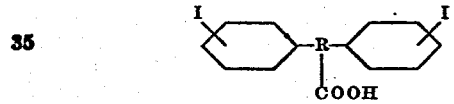

and their alkali metal salts, R being a trivalent alkene radical of from 2 to 3 carbon atoms, the iodine atoms being attached directly to nuclear carbons in positions other than the ortho position.

ERWIN SCHWENK.
DOMENICK PAPA.

REFERENCES CITED

The following references are of record in the file of this patent:

UNITED STATES PATENTS

| Number | Name | Date |
|---|---|---|
| 2,345,384 | Dohrn et al. | Mar. 28, 1944 |
| 2,247,880 | Guerbet | July 1, 1941 |

FOREIGN PATENTS

| Number | Country | Date |
|---|---|---|
| 13,526 | Great Britain | 1911 |
| 194,452 | Switzerland | Feb. 16, 1938 |
| 517,382 | Great Britain | July 25, 1938 |

OTHER REFERENCES

Shoppee, Jour. Chem. Soc., 1930, pages 168–985.
Hewett, Jour. Chem. Soc., 1938, pages 1286–1291.
Thiele et al., Liebig's Annalen, vol. 306, pages 208–210.